United States Patent
Song et al.

(10) Patent No.: US 10,554,376 B2
(45) Date of Patent: Feb. 4, 2020

(54) BS AND UE, AND METHODS USED IN THE SAME

(71) Applicant: TELEFONAKTIEBOLAGET L M ERICSSON (PUBL), Stockholm (SE)

(72) Inventors: Xinghua Song, Beijing (CN); Erik Eriksson, Linköping (SE); Rui Fan, Beijing (CN); Zhiheng Guo, Beijing (CN); Shaohua Li, Beijing (CN); Jinhua Liu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 156 days.

(21) Appl. No.: 14/910,305

(22) PCT Filed: Nov. 25, 2013

(86) PCT No.: PCT/CN2013/087770
§ 371 (c)(1),
(2) Date: Feb. 5, 2016

(87) PCT Pub. No.: WO2015/018142
PCT Pub. Date: Feb. 12, 2015

(65) Prior Publication Data
US 2016/0204930 A1      Jul. 14, 2016

(30) Foreign Application Priority Data
Aug. 8, 2013 (WO) ............... PCT/CN2013/081084

(51) Int. Cl.
*H04L 5/14* (2006.01)
*H04W 72/04* (2009.01)

(52) U.S. Cl.
CPC ......... *H04L 5/1476* (2013.01); *H04W 72/042* (2013.01); *H04W 72/0446* (2013.01)

(58) Field of Classification Search
CPC .............. H04L 5/1476; H04W 72/042; H04W 72/0446
See application file for complete search history.

(56) References Cited

U.S. PATENT DOCUMENTS

2010/0303011 A1* 12/2010 Pan ...................... H04L 5/0007
370/328
2013/0163543 A1* 6/2013 Freda ................ H04W 72/0406
370/329

(Continued)

FOREIGN PATENT DOCUMENTS

CN        103037524 A      4/2013
WO     2012/134580 A1    10/2012

(Continued)

OTHER PUBLICATIONS

International Search Report and Written Opinion issued by the ISA in corresponding International application No. PCT/CN2013/087770, dated May 14, 2014.

(Continued)

*Primary Examiner* — Mandish K Randhawa
(74) *Attorney, Agent, or Firm* — Patent Portfolio Builders, PLLC

(57) ABSTRACT

The present disclosure relates to a method used in a BS and an associated BS. The method includes: obtaining one or more dynamic UpLink (UL)/Downl_ink (DL) configurations of a cell served by the BS; transmitting, to a User Equipment (UE) located in the cell, the one or more dynamic UL/DL configurations in a resource region consisted of one or more consecutive Control Elements (CEs) over a downlink physical channel; and transmitting information associated with the resource region to the UE. The present disclosure also relates to a method used in a UE located in a cell served by a BS and an associated UE. The method includes: receiving, from the BS, one or more dynamic UL/DL (Continued)

configurations of the cell in a resource region consisted of one or more consecutive CEs over a downlink physical channel; receiving information associated with the resource region from the BS; and identifying the one or more dynamic UL/DL configurations based on the information associated with the resource region.

16 Claims, 9 Drawing Sheets

(56) References Cited

U.S. PATENT DOCUMENTS

| | | | |
|---|---|---|---|
| 2013/0188516 A1 | 7/2013 | He et al. | |
| 2013/0188533 A1 | 7/2013 | He et al. | |
| 2014/0050186 A1* | 2/2014 | Kim | H04W 56/0045 370/329 |
| 2014/0119335 A1* | 5/2014 | Wang | H04W 72/042 370/330 |
| 2014/0177492 A1* | 6/2014 | Sun | H04L 5/0094 370/280 |
| 2014/0286277 A1* | 9/2014 | Jang | H04L 5/0048 370/329 |
| 2015/0029910 A1* | 1/2015 | He | H04W 4/70 370/280 |
| 2015/0146639 A1* | 5/2015 | Seo | H04L 5/0094 370/329 |

FOREIGN PATENT DOCUMENTS

| | | |
|---|---|---|
| WO | 2013/036005 A1 | 3/2013 |
| WO | 2013112665 A1 | 8/2013 |

OTHER PUBLICATIONS

International Preliminary Report on Patentability issued by the International Preliminary Examining Authority in corresponding International application No. PCT/CN2013/087770, dated Nov. 24, 2015, 9 pages.
Ericsson, "Efficient use of explicit signaling," 3GPP TSG-RAN WG1 #74, R1-133416, Aug. 19-23, 2013, 4 pages.
Ericsson, "On efficient transmission of explicit signaling," 3GPP TSG-RAN WG1 #74, R1-133417, Aug. 19-23, 2013, 3 pages.
Ericsson, "HARQ and scheduling timing for eIMTA," 3GPP TSG-RAN WG1 #74, R1-133418, Aug. 19-23, 2013, 4 pages.
Renesas Mobile Europe Ltd, "Further Discussion on Signaling Schemes for TDD eIMTA," 3GPP TSG RAN WG1 Meeting #73, R1-132168, May 20-24, 2013, 5 pages.
Extended European Search Report received in corresponding Application No. 13891057.5, dated May 17, 2017; 7 pages.
Office Action issued in corresponding EP Application No. 13891057.5; dated Feb. 13, 2019; 05 pages. The reference not cited therein has been previously made of record.

* cited by examiner

BS AND UE, AND METHODS USED IN THE SAME

CROSS REFERENCE TO RELATED APPLICATION(S)

This application is a 35 U.S.C. § 371 National Phase Entry Application from PCT/CN2013/087770, filed Nov. 25, 2013, designating the United States, which claims priority to PCT/CN2013/081084, filed Aug. 8, 2013. The above identified applications are incorporated by reference.

TECHNICAL FIELD

The technology presented in this disclosure generally relate to radio communication networks, particularly (though not exclusively) radio communication networks using Time Division Duplex (TDD), for example Long-Term Evolution (LTE) TDD. More particularly, the present disclosure relates to a method used in a base station (BS) and a method used in a User Equipment (UE) relating to explicit signaling carrying, e.g., uplink-downlink (UL-DL) time division duplex (TDD) configuration(s), and related BS and UE for implementing the same.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In a typical cellular radio system, UEs can communicate via a radio access network (RAN) to one or more core networks (CN). The RAN generally covers a geographical area which is divided into radio cell areas. Each radio cell area can be served by a BS, e.g., a radio base station (RBS), which in some networks may also be called, for example, a "NodeB" (UMTS) or "eNodeB (eNB)" (LTE). A radio cell is a geographical area where radio coverage is generally provided by the radio base station at a base station site. Each radio cell can be identified by an identity within the local radio area, which is broadcast in the radio cell. The base stations communicate over the air interface operating on radio frequencies with the UEs within range of the base stations. In some radio access networks, several base stations may be connected (for example, by landlines or microwave) to a radio network controller (RNC) or a base station controller (BSC). The radio network controller may be configured to supervise and coordinate the various activities of the plurality of base stations connected thereto. The radio network controllers may also be connected to one or more core networks.

The Universal Mobile Telecommunications System (UMTS) is a third generation mobile communication system, which evolved from the Global System for Mobile Communications (GSM). The Universal Terrestrial Radio Access Network (UTRAN) is essentially a radio access network using Wideband Code Division Multiple Access (WCDMA) for UEs. As an alternative to WCDMA, Time Division Synchronous Code Division Multiple Access (TD-SCDMA) could be used. In a standardization forum known as the Third Generation Partnership Project (3GPP), telecommunications suppliers propose and agree upon standards for third generation networks and UTRAN specifically, and investigate e.g. enhanced data rate and radio capacity. The 3GPP has undertaken to evolve the UTRAN and GSM based radio access network technologies. The first releases for the Evolved Universal Terrestrial Radio Access Network (E-UTRAN) specification have been issued. The Evolved Universal Terrestrial Radio Access Network (E-UTRAN) comprises the LTE and System Architecture Evolution (SAE). The LTE is a variant of a 3GPP radio access technology where the radio base station nodes are connected to a core network (e.g., via Access Gateways (AGWs)) rather than to RNC nodes. In general, in LTE the functions of a RNC node are distributed between the radio base stations nodes (eNodeB's in LTE) and AGWs. As such, the RAN of an LTE system has what is sometimes referred to as a "flat" architecture including radio base station nodes without reporting to RNC nodes.

Transmission and reception from a node, e.g., a radio terminal like a UE in a cellular system such as LTE, can be multiplexed in the frequency domain or in the time domain (or combinations thereof). In Frequency Division Duplex (FDD), DL and UL transmission take place in different, sufficiently separated, frequency bands. In TDD, DL and UL transmission take place in different, non-overlapping time slots. Thus, TDD can operate in unpaired frequency spectrum, whereas FDD generally requires paired frequency spectrum.

Typically, a transmitted signal in a radio communication system is organized in some form of frame structure, or frame configuration. For example, LTE generally uses ten equally sized subframes 0-9 of length 1 ms per radio frame as illustrated in FIG. 1. In case of TDD as shown in FIG. 1, there is generally only a single carrier frequency, and UL and DL transmissions are separated in time. Because the same carrier frequency is used for UL and downlink transmission, both the base station and the UEs need to switch from transmission to reception and vice versa. An important aspect of a TDD system is to provide a sufficiently large guard time where neither DL nor UL transmissions occur in order to avoid interference between UL and DL transmissions. For LTE, special subframes (e.g., subframe #1 and, in some cases, subframe #6) provide this guard time. A TDD special subframe is generally split into three parts: a downlink part (DwPTS), a guard period (GP), and an UL part (UpPTS). The remaining subframes are either allocated to UL or DL transmission. Example UL-DL TDD configurations (also referred to as "TDD configuration" in the present disclosure) are shown in Table 1 below. Also, exemplary special subframe configurations are shown in Table 2 below.

TABLE 1

Exemplary UL and DL configurations in TDD

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

Example configurations of special subframe

| | | Normal cyclic prefix in downlink | | | Extended cyclic prefix in downlink | |
| --- | --- | --- | --- | --- | --- | --- |
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

TDD allows for different asymmetries in terms of the amount of resources allocated for UL and DL transmission, respectively, by means of different DL/UL configurations. In LTE, there are seven different configurations, see FIG. 2. Generally speaking, to avoid significant interference between DL and UL transmissions between different radio cells, neighboring radio cells should have the same DL/UL configuration. Otherwise, UL transmission in one radio cell may interfere with DL transmission in the neighboring radio cell (and vice versa). As a result, the DL/UL asymmetry generally does not vary between radio cells. The DL/UL asymmetry configuration is signaled, i.e. communicated, as part of the system information and can remain fixed for a long time.

Consequently, the TDD networks generally use a fixed frame configuration where some subframes are UL and some are DL. This may prevent or at least limit the flexibility to adopt the UL and/or DL resource asymmetry to varying radio traffic situations.

In future networks, it is envisioned that we will see more and more localized traffic, where most of the users will be in hotspots, or in indoor areas, or in residential areas. These users will be located in clusters and will produce different UL and DL traffic at different time. This essentially means that a dynamic feature to adjust the UL and DL resources to instantaneous (or near instantaneous) traffic variations would be required in future local area cells.

TDD has a potential feature where the usable band can be configured in different time slots to either UL or DL. It allows for asymmetric UL/DL allocation, which is a TDD-specific property, and not possible in FDD. There are seven different UL/DL allocations in LTE, providing 40%-90% DL resources.

In the current networks, UL/DL configuration is semi-statically configured, thus it may not match the instantaneous traffic situation. This will result in inefficient resource utilization in both UL and DL, especially in cells with a small number of users. In order to provide a more flexible TDD configuration, so-called Dynamic TDD (also referred to as Flexible TDD) has therefore been introduced. Thus, Dynamic TDD configures the TDD UL/DL asymmetry based on current traffic situation in order to optimize user experience. Dynamic TDD provides the possibility for a subframe to be configured as "flexible" subframe. As a result, some subframes can be configured dynamically as either for UL transmission or for DL transmission. The subframes can for example be configured as either for UL transmission or DL transmission depending on e.g. the radio traffic situation in a cell. Accordingly, Dynamic TDD can be expected to achieve promising performance improvement in TDD systems when there is a potential load imbalance between UL and DL. Besides, Dynamic TDD approach can also be utilized to reduce network energy consumption. It is expected that dynamic UL/DL allocation (hence referred in this section "Dynamic TDD") should provide a good match of allocated resources to instantaneous traffic.

A group common explicit signaling can be used to notify UE of the instantaneous UL-DL configuration in the cell. However, the detailed design of this explicit signaling, e.g., what transmit format will be used and how resource mapping is done, is unknown. Therefore, there is a need for such a design, which should be general and applicable to all kinds of scenarios especially heterogeneous deployment.

SUMMARY

It is in view of the above considerations and others that the various embodiments of the present technology have been made.

According to a first aspect of the present disclosure, there is proposed a method used in a BS. The method includes obtaining one or more dynamic UL/DL configurations of a cell served by the BS. The method includes transmitting, to a UE located in the cell, the one or more dynamic UL/DL configurations of the cell in a resource region consisted of one or more consecutive Control Elements (CEs) over a downlink physical channel. The method further includes transmitting information associated with the resource region to the UE.

According to a second aspect of the present disclosure, there is proposed a method used in a UE located in a cell served by a BS. The method includes receiving, from the BS, one or more dynamic UL/DL configurations of the cell in a resource region consisted of one or more consecutive CEs over a downlink physical channel, and receiving information associated with the resource region from the BS. The method further includes identifying the one or more dynamic UL/DL configurations based on the information associated with the resource region.

According to a third aspect of the present disclosure, there is proposed a BS for implementing the above method. The BS includes an obtaining unit and a transmitting unit. The obtaining unit is configured to obtain one or more dynamic UL/DL configurations of a cell served by the BS. The transmitting unit is configured to transmit, to a UE located in the cell, the one or more dynamic UL/DL configurations of the cell in a resource region consisted of one or more consecutive CEs over a downlink physical channel. The transmitting unit is further configured to transmit information associated with the resource region to the UE.

According to a fourth aspect of the present disclosure, there is proposed a UE located in a cell served by a BS. The UE includes a receiving unit and an identifying unit. The receiving unit is configured to receive, from the BS, one or more dynamic UL/DL configurations of the cell in a resource region consisted of one or more consecutive CEs over a downlink physical channel. The receiving unit is further configured to receive information associated with the resource region from the BS. The identifying unit is configured to identify the one or more dynamic UL/DL configurations based on the information associated with the resource region.

Accordingly, it is possible to transmit/monitor the dynamic UL/DL configuration(s) of the cell either via explicit signaling, e.g., PDCCH or ePDCCH, or via other physical layer signal.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

Figure 1:
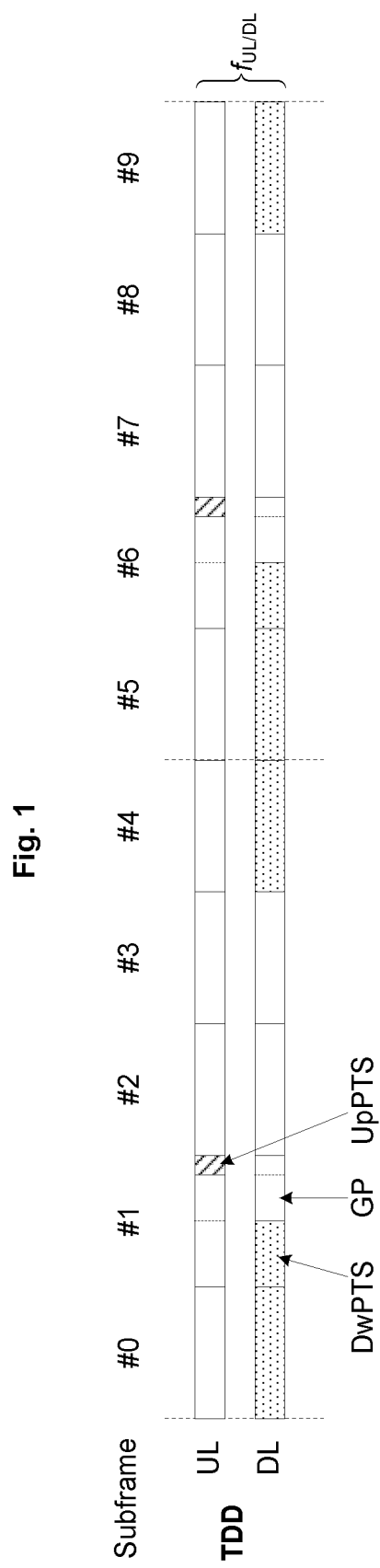
FIG. 1 illustrates uplink/downlink time/frequency structure for LTE TDD.
Figure 2:
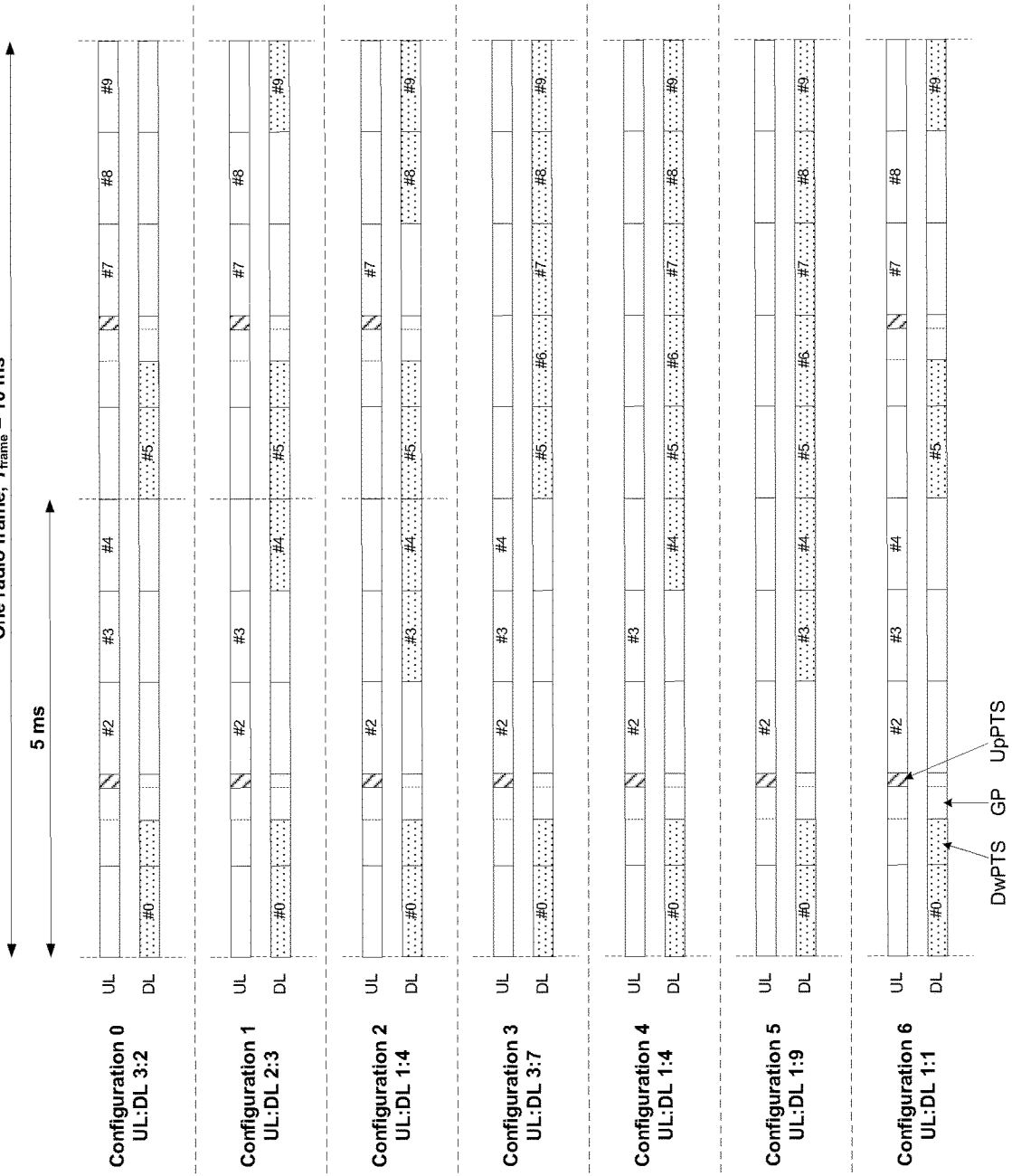
FIG. 2 is a diagram illustrating an example of seven different downlink/uplink configurations for LTE TDD.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

As used hereinafter, it should be appreciated the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC (Machine Type Communication) devices, which do not necessarily involve human interaction. Also, the term "radio network node" as used herein generally denotes a fixed point being capable of communicating with the UE. As such, it may be referred to as a base station, a radio base station, a NodeB or an evolved NodeB (eNB), access point, relay node, etcetera.

Figure 5:
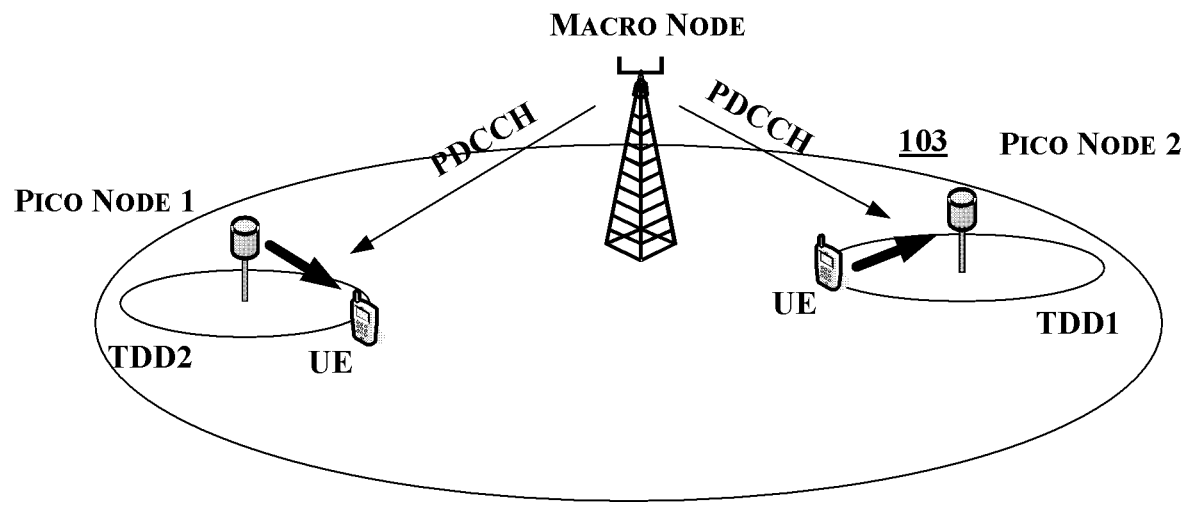
FIG. 5 illustrates a wireless communication scenario where PDCCH is the downlink physical channel to convey explicit signaling.

One important and promising heterogeneous deployment is shared cell, where several pico nodes have the same cell ID with an overlaid macro as shown in FIG. 5. In such a scenario, different pico nodes may need different UL-DL configurations. How to signal node-specific UL-DL configuration is a needs to be decided. If this explicit signaling is transmitted by PDCCH, since all pico cells within a common (macro) cell has the same PDCCH, it is a problem that one PDCCH is used to convey different UL-DL configuration for UEs within different pico nodes. If this explicit signaling is transmitted by ePDCCH, as ePDCCH is UE specific, it is a problem to transmit this group common information. If a new physical signaling is used for the explicit signaling, both the transmit format and resource mapping should be decided. In all cases, backward compatibility should be maintained.

Moreover, in future high density network, the serving node of a UE may be frequently changed. Hence, it is preferred that the UE can monitor UL-DL configuration of it serving node as well as one or multiple best neighboring nodes so that the UE can better handle the serving node switch, downlink CoMP receiving, inter-node interference suppression/cancellation, channel and or interference filtering etc.

Depending on whether PDCCH, ePDCCH or other physical layer channel is used to convey this group common explicit signaling, the present disclosure proposes different solutions.

In case PDCCH is used, the present disclosure relates to allocating one resource region within PDCCH for the explicit signaling, e.g. a set of Control Channel Elements (CCEs) within the search space. Multiple resource regions can be defined to support multiple pico nodes. A UE can be configured to monitor multiple explicit signaling from different resource regions. The size of the region can either be predefined or configured by the eNB. A UE is informed via dedicated signaling of the resource region, e.g. starting CCE index and/or the size of the region, to monitor this group common signaling.

In case ePDCCH is used, the present disclosure relates to allocating one resource region within ePDCCH for the explicit signaling, e.g. a set of enhanced Control Channel Elements (eCCEs) within the search space. If more than one ePDCCH sets are configured, the index of the ePDCCH set in which the explicit signaling is mapped is also signaled to the UE. A UE can be configured to monitor multiple explicit signaling from different ePDCCH sets. A UE is informed via dedicated signaling of the region, e.g. starting eCCE index and/or the size of the region, to monitor this group common signaling.

In case a new downlink physical channel other than PDCCH/ePDCCH is used, this new downlink physical channel is multiplexed on REG(s) for PDCCH or on eREG(s) for ePDCCH.

Figure 3:
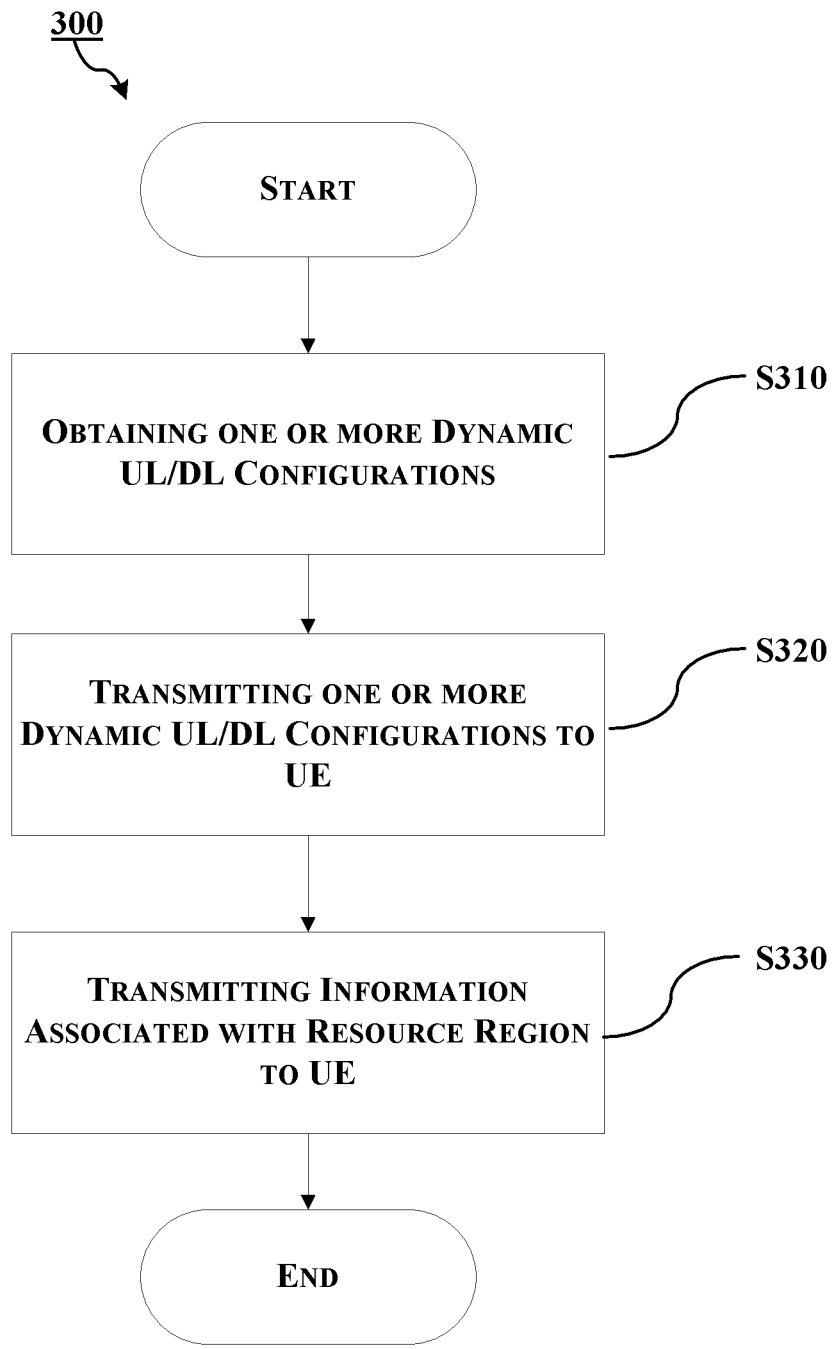
FIG. 3 is a flowchart of the method 300 according to some embodiments of the present disclosure.

FIG. 3 shows a flowchart of a method 300 used in a BS according to some embodiments of the present disclosure.

Referring to FIG. 3, the BS obtains one or more dynamic UL/DL configurations of a cell served by the BS (step S310). For example, the dynamic UL/DL configuration(s) here may be either configured by the BS itself, or received by the BS from other nodes (e.g., pico nodes) existing in the cell.

As step S320, the BS transmits the one or more dynamic UL/DL configurations of the cell to a UE located in the cell in a resource region consisted of one or more consecutive CEs over a downlink physical channel.

The downlink physical channel may be PDCCH, ePDCCH or a new physical channel other than PDCCH, ePDCCH.

In one implementation, if the downlink physical channel is PDCCH, the one or more consecutive CEs over the downlink physical channel refer to one or more consecutive CCEs. In this case, each of the one or more dynamic UL/DL configurations may correspond to a pico node existing in the cell.

In another implementation, if the downlink physical channel is ePDCCH, the one or more consecutive CEs over the downlink physical channel refer to one or more consecutive eCCEs within an ePDCCH set. In this case, the method 300 may further include a step of transmitting an index of the ePDCCH set to the UE (not shown).

In a further implementation, if the downlink physical channel is a new physical channel other than PDCCH, ePDCCH, the method 300 may include a step of multiplexing the downlink physical channel on one or more consecutive or inconsecutive Resource Element Groups (RGEs) within PDCCH or a step of multiplexing the downlink physical channel on one or more consecutive or inconsecutive enhanced Resource Element Groups (eRGEs) within ePDCCH (not shown).

As step S330, the BS transmits information associated with the resource region to the UE.

In one implementation, the information associated with the resource region may include an index of the first CE among the one or more consecutive CEs, or an offset from the start or end of search space of the downlink physical channel.

In another implementation, the information associated with the resource region may include a size of the resource region, which is preconfigured by the BS.

In a further implementation, the information associated with the resource region may be determined by using an RNTI used for scrambling with CRC bits of the one or more dynamic UL/DL configurations. For example, the information associated with the resource region may be expressed by:

$$L\{f(RNTI,k) \bmod \lfloor N_{CE,k}/L \rfloor\}+i, i=0,\ldots,L-1,$$

wherein L is the aggregation level for the one or more dynamic UL/DL configurations, $f(RNTI,k)$ is a function of RNTI and subframe number k, and $N_{CE,k}$ is the number of CEs in subframe k.

Figure 4:
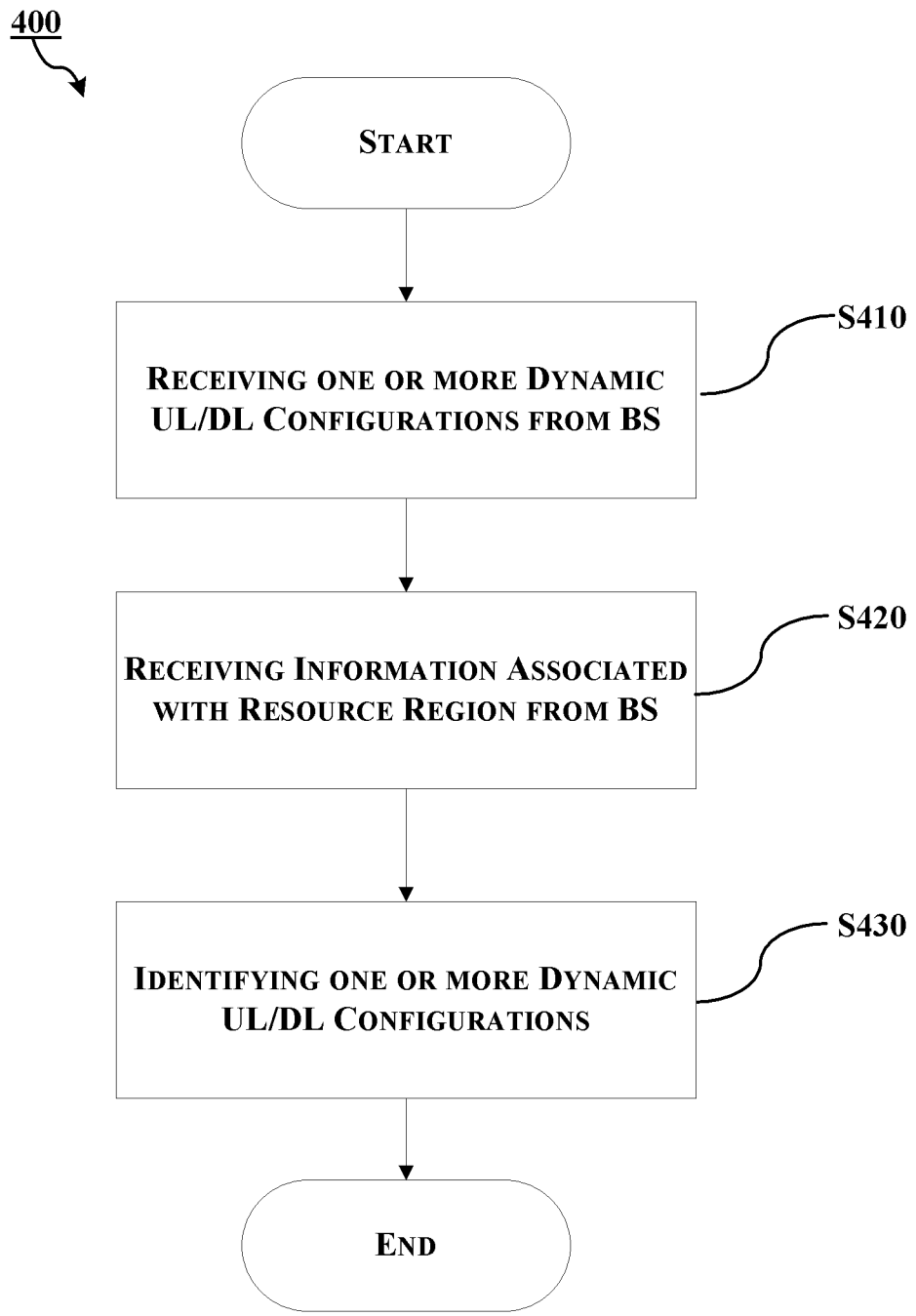
FIG. 4 is a flowchart of the method 400 used in a UE located in a cell served by a BS according to some embodiments of the present disclosure.

FIG. 4 shows a flowchart of the method 400 used in a UE located in a cell served by a BS according to some embodiments of the present disclosure.

Referring to FIG. 4, the UE receives, from the BS, one or more dynamic UL/DL configurations of the cell in a resource region consisted of one or more consecutive CEs over a downlink physical channel (step S410).

The downlink physical channel may be PDCCH, ePDCCH or a new physical channel other than PDCCH, ePDCCH.

In one implementation, if the downlink physical channel is PDCCH, the one or more consecutive CEs over the downlink physical channel refer to one or more consecutive CCEs.

In another implementation, if the downlink physical channel is ePDCCH, the one or more consecutive CEs over the downlink physical channel refer to one or more consecutive eCCEs within an ePDCCH set. In this case, the method 400 may further include a step of receiving an index of the ePDCCH set from the BS (not shown).

In a further implementation, if the downlink physical channel is a new physical channel other than PDCCH, ePDCCH, the downlink physical channel may be multiplexed on one or more consecutive or inconsecutive RGEs within PDCCH, or the downlink physical channel may be multiplexed on one or more consecutive or inconsecutive eRGEs within ePDCCH.

At step S420, the UE receives information associated with the resource region from the BS.

At step S430, the UE identifies the one or more dynamic UL/DL configurations based on the information associated with the resource region.

In one implementation, the information associated with the resource region may include an index of the first CE among the one or more consecutive CEs, or an offset from the start or end of search space of the downlink physical channel.

In another implementation, the information associated with the resource region may include a size of the resource region, which is preconfigured by the BS.

In a further implementation, the information associated with the resource region may be determined by using an RNTI used for scrambling with CRC bits of the one or more dynamic UL/DL configurations. For example, the information associated with the resource region may be expressed by:

$$L\{f(RNTI,k) \bmod \lfloor N_{CE,k}/L \rfloor\}+i, i=0,\ldots,L-1,$$

wherein L is the aggregation level for the one or more dynamic UL/DL configurations, $f(RNTI,k)$ is a function of RNTI and subframe number k, and $N_{CE,k}$ is the number of CEs in subframe k.

According to some embodiments of the present invention, if the resource region is overlapped with a part of the UE's search space, PDCCH candidates in the overlapped part of the UE's search space may be excluded from blinding detection of the UE's search space or are still in blinding detection of the UE's search space.

Hereinafter, some embodiments on the methods 300 and 400 will be explained in details by assuming PDCCH, ePDCCH, and a new physical channel other than PDCCH and ePDCCH as the downlink physical channel, respectively.

Embodiment 1—PDCCH

FIG. 5 illustrates a wireless communication scenario where PDCCH is the downlink physical channel to convey explicit signaling.

As shown in FIG. 5, there are one Macro cell served by a Macro BS 110 and two pico cells served by two pico BSs 120 and 130. This is just of illustrative, and the present disclosure is not limited to such a scenario. For example, any appropriate number of pico BSs may be configured. The pico BSs 120 and 130 have the same cell ID with the Macro BS 110. As mentioned above, all the pico cells within a macro cell have the same PDCCH. With respect to FIG. 5, the two pico cells have the same PDCCH from the Macro cell. That is, the PDCCH transmitted from the Macro BS 110 covers all the pico cells within the macro cell. In this case, dynamic UL-DL configurations of respective pico cells within the macro cell are transmitted to a corresponding UE over the PDCCH transmitted from the Macro BS 110, as shown in FIG. 5.

When applying the method 300 in the scenario as shown in FIG. 5, the BS as mentioned in the method 300 may refer to the Macro BS 110 here.

In this case, the step S310 may be specifically embodied as the Macro BS 110 obtaining dynamic UL/DL configuration(s) of the pico BSs 120 and 130. Similarly, the step S320 may be implemented as the Macro BS 110 transmitting the dynamic UL/DL configuration(s) to the UE served by the pico BS 120 or the UE served by the pico BS 130 in a resource region consisting of one or more consecutive CCEs over PDCCH.

As an example, each of the dynamic UL/DL configuration(s) may correspond to a pico node existing in the cell. In this way, the UE may monitor more than one pico nodes' dynamic UL/DL configuration(s).

The step S330 may be implemented as the Macro BS 110 transmitting information associated with the resource region to the UE.

As an example, the information associated with the resource region may include an index of the first CCE among the one or more consecutive CCEs, or an offset from the start or end of PDCCH search space.

As another example, the information associated with the resource region may include a size of the resource region, which is preconfigured by the BS.

As yet another example, the information associated with the resource region is determined by using an RNTI used for scrambling with CRC bits of the one or more dynamic UL/DL configurations. For example, the information associated with the resource region is expressed by:

$$L\{f(RNTI,k) \bmod \lfloor N_{CE,k}/L \rfloor\}+i, \ i=0, \ldots, L-1,$$

wherein L is the aggregation level for the one or more dynamic UL/DL configurations, $f(RNTI,k)$ is a function of RNTI and subframe number k, and $N_{CCE,k}$ is the number of CCEs in subframe k.

When applying the method 400 in the scenario as shown in FIG. 5, the BS as mentioned in the method 400 may refer to the Macro BS 110 here, and the UE as mentioned in the method 400 may refer to the UE served by the pico BS 120 (only for illustration purpose, it may also be the UE served by the pico BS 130 or other pico nodes existing in the cell served by the Macro BS 110).

In this case, the step S410 may be specifically embodied as the UE receiving, from the Marco BS 110, dynamic UL/DL configuration(s) of the pico BSs 120 and 130 and the other pico nodes existing in the cell served by the Macro BS 110 in a resource region consisted of one or more consecutive CCEs over PDCCH.

As an example, each of the dynamic UL/DL configuration(s) may correspond to a pico node existing in the cell.

The step S420 may be embodied as the UE receiving information associated with the resource region from the Macro BS 110. The step S430 may be embodied as the UE identifying the one or more dynamic UL/DL configurations based on the information associated with the resource region.

As an example, the information associated with the resource region may include an index of the first CCE among the one or more consecutive CCEs, or an offset from the start or end of PDCCH search space.

As another example, the information associated with the resource region may include a size of the resource region, which is preconfigured by the BS.

As yet another example option, the information associated with the resource region is determined by using an RNTI used for scrambling with CRC bits of the one or more dynamic UL/DL configurations. For example, the information associated with the resource region is expressed by:

$$L\{f(RNTI,k) \bmod \lfloor N_{CCE,k}/L \rfloor\}+i, \ i=0, \ldots, L-1,$$

wherein L is the aggregation level for the one or more dynamic UL/DL configurations, $f(RNTI,k)$ is a function of RNTI and subframe number k, and $N_{CCE,k}$ is the number of CCEs in subframe k.

Figure 6:
FIG. 6 illustrates one example PDCCH search space for explicit signaling.

FIG. 6 illustrates one example PDCCH search space for explicit signaling carrying dynamic UL/DL configuration(s). As shown in FIG. 6, a resource region having left-hand diagonals is used for transmitting one explicit signaling to the UE served by the pico BS 120, and a resource region having right-hand diagonals is used for transmitting another explicit signaling to the UE served by the pico BS 130.

In this way, multiple resource regions can be configured and each region carries one explicit signaling for one pico node. Then, the UE may monitor multiple explicit signaling by indication of multiple resource regions via dedicated signaling. The mapping between the resource regions and the pico nodes can be predefined. For example, as shown in FIG. 6, the explicit signaling for a first pico node (corresponding to the pico BS 120) is carried over a first resource region (i.e., the two blocks having left-hand diagonals), while the explicit signaling for a second pico node (corresponding to the pico BS 130) is carried over a second resource region (i.e., the two blocks having right-hand diagonals).

As mentioned above, the size of each resource region may be preconfigured or predefined by the BS. A position of a resource region, such as the resource region having left-hand diagonals as shown in FIG. 6, may be indicated by, e.g., an index of the first CCE among one or more consecutive CCEs of the resource region, or an offset from the start or end of PDCCH search space.

Embodiment 2—ePDCCH

Figure 7:
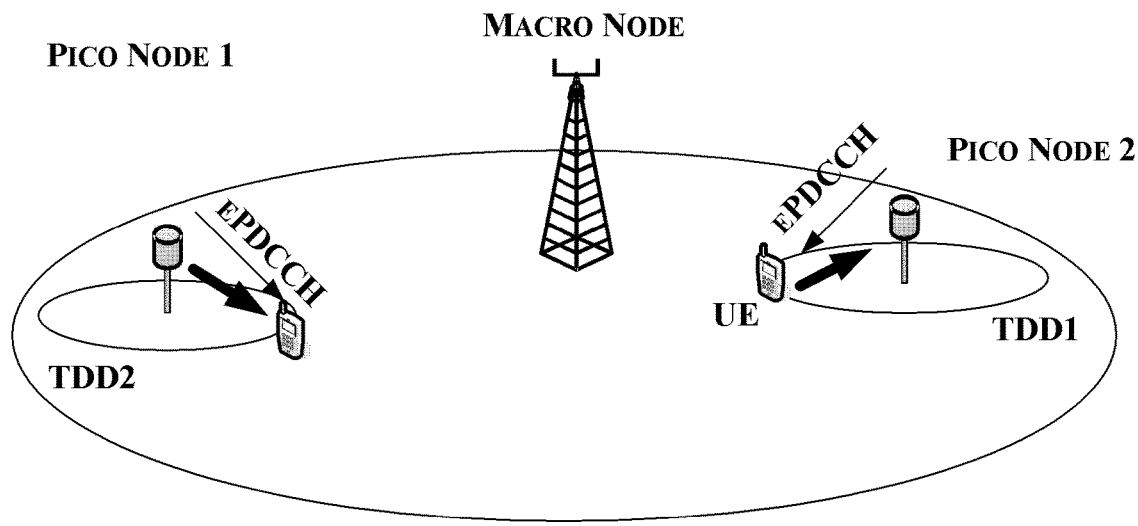
FIG. 7 illustrates a wireless communication scenario where ePDCCH is the downlink physical channel to convey explicit signaling.

FIG. 7 illustrates a wireless communication scenario where ePDCCH is the downlink physical channel to convey explicit signaling.

The wireless communication scenario of FIG. 7 is similar as that of FIG. 5, with an exception that each pico node may transfer the explicit signaling to a UE served by the pico node via ePDCCH.

When applying the method 300 in the scenario as shown in FIG. 7, the BS as mentioned in the method 300 may refer to the pico BS 120 (just for illustration, it may also be the pico BS 130 or the other pico nodes existing in the cell served by the Macro BS 110).

In this case, the step S310 may be specifically embodied as the pico BS 120 obtaining its own dynamic UL/DL configuration(s) in accordance with the current 3GPP specification. Similarly, the step S320 may be implemented as the pico BS 120 transmitting the dynamic UL/DL configuration(s) to the UE served by the pico BS 120 itself in a resource region consisting of one or more consecutive eCCEs within an ePDCCH set.

Figure 8:
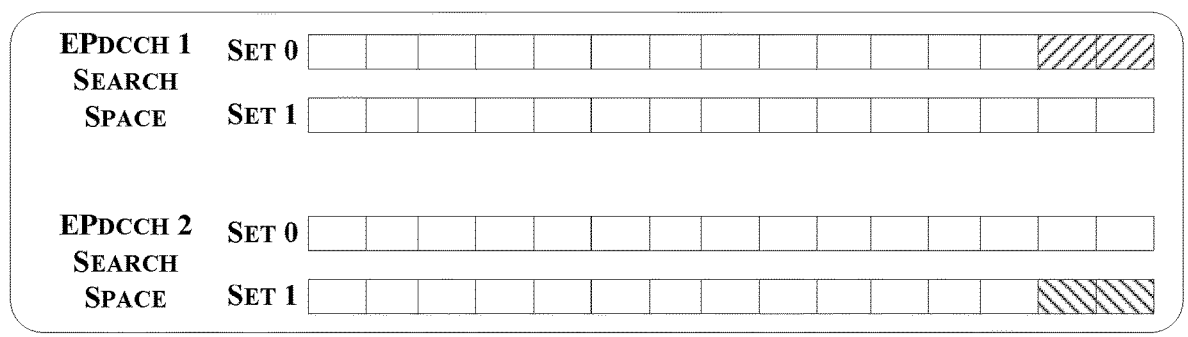
FIG. 8 illustrates two example ePDCCH search spaces for explicit signaling.

The method 300 of FIG. 3 may further include a step of an index of the ePDCCH set to the UE (not shown). In one case, a UE can be configured to monitor only one explicit signaling from one ePDCCH set even when more than one ePDCCH sets are configured. In another case, a UE can be configured to monitor multiple explicit signaling from different ePDCCH sets. As shown in FIG. 8, two ePDCCH sets are configured and two resource regions are defined for the two sets respectively.

The step S330 may be executed as the pico BS 120 transmitting information associated with the resource region to the UE.

As an example, the information associated with the resource region may include an index of the first eCCE among the one or more consecutive eCCEs, or an offset from the start or end of ePDCCH search space.

As another example, the information associated with the resource region may include a size of the resource region, which is preconfigured by the BS.

As yet another example, the information associated with the resource region may include determined by using an RNTI used for scrambling with CRC bits of the one or more dynamic UL/DL configurations. For example, the information associated with the resource region is expressed by:

$$L\{f(RNTI,k) \mod \lfloor N_{eCCE,k}/L \rfloor\}1+i, i=0,\ldots,L-1,$$

wherein L is the aggregation level for the one or more dynamic UL/DL configurations, $f(RNTI,k)$ is a function of RNTI and subframe number k, and $N_{eCCE,k}$ is the number of eCCEs in subframe k.

When applying the method 400 in the scenario as shown in FIG. 7, the BS as mentioned in the method 300 may refer to the pico BS 120 (just for illustration, it may also be the pico BS 130 or the other pico nodes existing in the cell served by the Macro BS 110), and the UE may refer to the UE served by the pico BS 120.

In this case, the step S410 may be specifically embodied as the UE receiving dynamic UL/DL configuration(s) of the pico BS 120 from the pico BS 120 in a resource region consisting of one or more consecutive eCCEs within an ePDCCH set.

The method 400 of FIG. 4 may further include a step of receiving an index of the ePDCCH set from the pico BS 120. In one case, a UE can be configured to monitor only one explicit signaling from one ePDCCH set even when more than one ePDCCH sets are configured. In another case, a UE can be configured to monitor multiple explicit signaling from different ePDCCH sets, e.g., as shown in FIG. 8.

The step S420 may be embodied as the UE receiving information associated with the resource region from the pico BS 120. The step S430 may be embodied as the UE identifying the one or more dynamic UL/DL configurations based on the information associated with the resource region.

As an example, the information associated with the resource region may include an index of the first eCCE among the one or more consecutive eCCEs, or an offset from the start or end of ePDCCH search space.

As another example, the information associated with the resource region may include a size of the resource region, which is preconfigured by the BS.

As yet another example, the information associated with the resource region may include determined by using an RNTI used for scrambling with CRC bits of the one or more dynamic UL/DL configurations. For example, the information associated with the resource region is expressed by:

$$L\{f(RNTI,k) \mod \lfloor N_{eCCE,k}/L \rfloor\}1+i, i=0,\ldots,L-1,$$

wherein L is the aggregation level for the one or more dynamic UL/DL configurations, $f(RNTI,k)$ is a function of RNTI and subframe number k, and $N_{eCCE,k}$ is the number of eCCEs in subframe k.

FIG. 8 illustrates two example ePDCCH search spaces for explicit signaling carrying dynamic UL/DL configuration(s). The ePDCCH search space 1 is for the pico BS 120, and the ePDCCH search space 2 is for the pico BS 130. As shown in FIG. 8, two ePDCCH sets are configured for each ePDCCH set. This is just of illustrative, and the present disclosure is not limited to two ePDCCH sets. For example, any appropriate number of ePDCCH sets may be configured. In the ePDCCH 1 search space, the resource region having left-hand diagonals is used for the pico BS 120 transmitting explicit signaling to the UE served by the pico BS 120. Here, the explicit signaling carries the pico BS 120's TDD configuration. In this case, the UE can be configured to monitor only explicit signaling from set 0 of the ePDCCH 1 search space.

Similarly, in the ePDCCH 2 search space, the resource region having right-hand diagonals is used for the pico BS 130 transmitting explicit signaling to the UE served by the pico BS 130. Here, the explicit signaling carries the pico BS 130's TDD configuration. In this case, the UE can be configured to monitor only explicit signaling from set 1 of the ePDCCH 2 search space.

As mentioned above, the size of each resource region may be preconfigured or predefined by the BS. A position of a resource region, such as the resource region having left-hand diagonals as shown in FIG. 8, may be indicated by, e.g., an index of the first eCCE among one or more consecutive eCCEs of the resource region, or an offset from the start or end of ePDCCH search space.

Embodiment 3

In this embodiment, the downlink physical channel may be multiplexed on one or more consecutive or inconsecutive RGEs within PDCCH. As an example, the downlink physical channel may be multiplexed on REG(s) for the PDCCH where no PDCCH is mapped or on reserved REG(s).

Here, the downlink physical channel is represented by a physical layer signal, which is the signal that carrying information without CRC check, similar as the PHICH signal. For example, after the PDCCH modulation, the modulated symbols are denoted by $\tilde{b}(0), \ldots, \tilde{b}(M_{tot}-1)$, the modulated symbols of the physical layer signal are assumed to be $\tilde{c}(0), \ldots, \tilde{c}(N-1)$, where N is the number of the modulated symbols for the signal. Then, the modulated symbols for the physical signal are mapped on to the modulated symbols for the PDCCH by the formula as $\tilde{b}(N_{offset}+j)=\tilde{c}(j), j=0\ldots N-1$, where $N_{offset}$ the start position where the physical signal is mapped. Here $N_{offset}$ could be any positive integer that smaller than $M_{tot}-N$. $N_{offset}$ could be included in an RRC signaling to inform the UE about the position of the explicit signaling. After the multiplexing, all the remained procedures and processing are the same as for the PDCCH.

In an example, to minimize the impact of the explicit signaling on the PDCCH, the physical layer signal could also be mapped with the PDCCH from the end of the symbols for the PDCCH. For example, the mapping of $\tilde{c}(0), \ldots, \tilde{c}(N-1)$ onto $\tilde{b}(0), \ldots, \tilde{b}(M_{tot}-1)$ could also be as $\tilde{b}(M_{tot}-N+j)=\tilde{c}(j)$, $j=0, \ldots N-1$. This is because, in some of the configurations of the system, the last V modulated symbols will never carry PDCCH information due to the fact that $M_{tot}$ is not an integral multiple of the number of symbols in a CCE.

In another example, if Q physical layer signal for the explicit signaling is about to be transmitted and the modulated symbols for each physical layer signal are denoted by $\tilde{c}_q(0), \ldots, \tilde{c}_q(N-1)$, $q=0, \ldots Q$, then the mapping could be as $$\tilde{b}(N_{offset}+j)=\tilde{c}_{\lfloor j/N \rfloor}(j \bmod(N)), j=0, \ldots NQ-1 \text{ or}$$

$$\tilde{b}(N_{offset}+jQ+q)=\tilde{c}_q(j), j=0, \ldots N-1 \text{ or}$$

$$\tilde{b}(M_{tot}-QN+j)=\tilde{c}_{\lfloor j/N \rfloor}(j \bmod(N)), j=0, \ldots NQ-1 \text{ or}$$

$$\tilde{b}(M_{tot}-QN+jQ+q)=\tilde{c}_q(j), j=0, \ldots N-1.$$

Embodiment 4

In this embodiment, the downlink physical channel may be multiplexed on one or more consecutive or inconsecutive RGEs within ePDCCH.

The method for the physical layer signal mapping could be also extended to ePDCCH. In one of the embodiment, for one or several explicit signal is transmitted, the modulated symbols are multiplexed together as $\tilde{c}(j)=\tilde{c}_{\lfloor j/N \rfloor}(j \bmod(N))$, $j=0, \ldots NQ-1$, or $\tilde{c}(jQ+q)=\tilde{c}_q(j)$, $j=0, \ldots N-1$, then the modulated symbols are mapped on one or several eCCE for the ePDCCH. Or in another embodiment, if the system is configured with S ePDCCH sets, the explicit signal are grouped into S groups, and multiplexed respectively, and each group will be mapped onto one or several eCCEs for the ePDCCH. The position where the explicit signal is mapped onto is signaled to the UE by RRC signaling. And of course each of the physical layer signal could be with different length. The multiple explicit signaling could also be multiplexed by CDM (coding division multiplexing) before mapping to the REGs.

Figure 9:
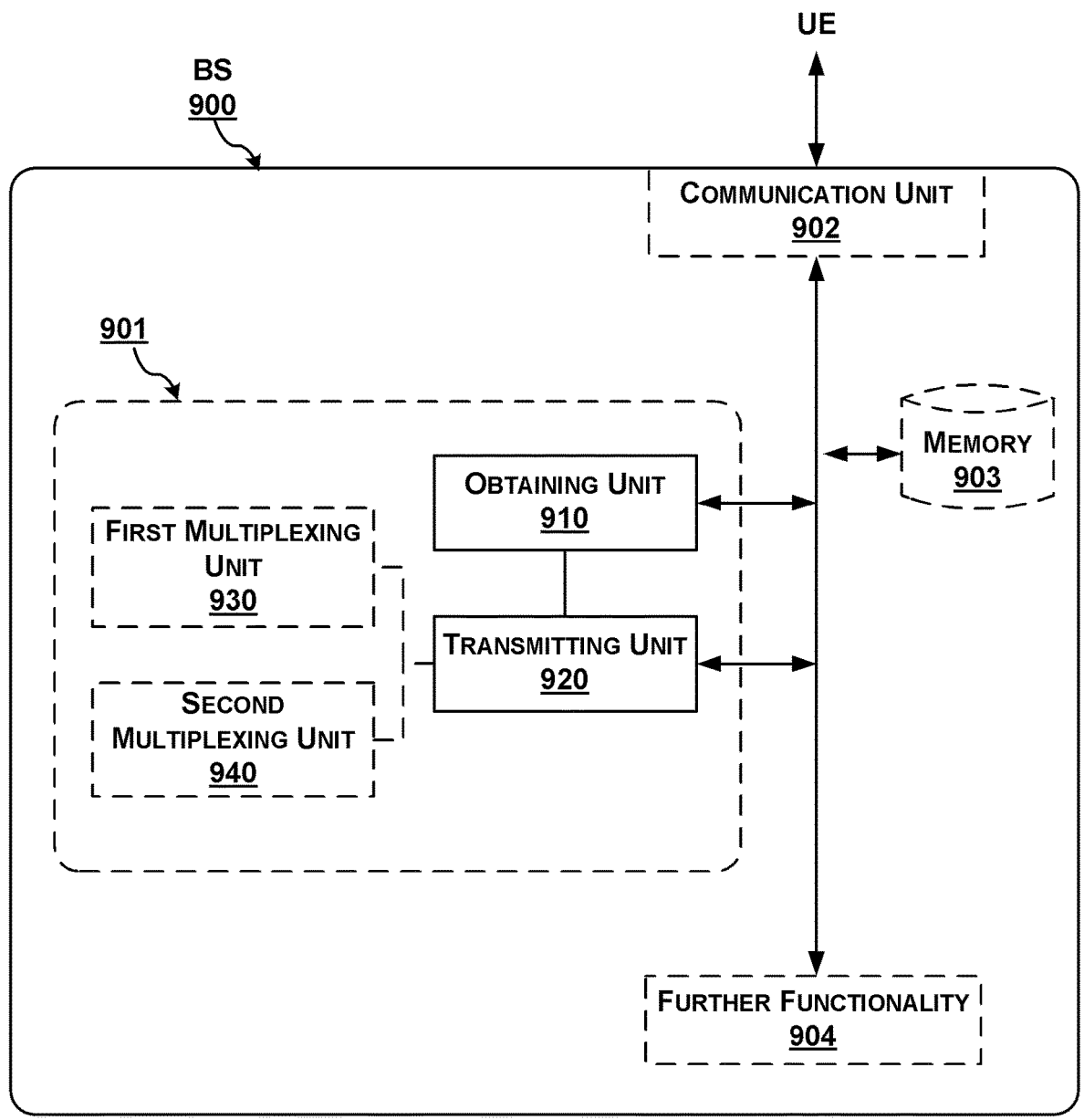
FIG. 9 is a schematic block diagram of BS 900 according to some embodiments of the present disclosure.

FIG. 9 is a schematic block diagram of BS 900 according to some embodiments of the present disclosure.

The part of BS 900 which is most affected by the adaptation to the herein described method is illustrated as an arrangement 901, surrounded by a dashed line. The BS 900 could be e.g. an eNB, or a NodeB, depending on in which type of communication system it is operable, e.g., LTE-type systems. The BS 900 and arrangement 901 are further configured to communicate with other entities via a communication unit 902 which may be regarded as part of the arrangement 901. The communication unit 902 comprises means for wireless communication, and may comprise means for, e.g., wired communication. The arrangement 901 or BS 900 may further comprise other functional units 904, such as functional units providing regular eNB functions, and may further comprise one or more storage units 903.

The arrangement 901 could be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 3. The arrangement part of the BS 900 may be implemented and/or described as follows.

Referring to FIG. 9, BS 900 may include an obtaining unit 910 and a transmitting unit 920.

The obtaining unit 910 may obtain one or more dynamic UL/DL configurations of a cell served by the BS. The transmitting unit 920 may transmit, to a UE located in the cell, the one or more dynamic UL/DL configurations of the cell in a resource region consisted of one or more consecutive CEs over a downlink physical channel.

The downlink physical channel may be PDCCH, ePDCCH or a new physical channel other than PDCCH, ePDCCH.

In one implementation, if the downlink physical channel is PDCCH, the one or more consecutive CEs over the downlink physical channel refer to one or more consecutive CCEs. In this case, each of the one or more dynamic UL/DL configurations may correspond to a pica node existing in the cell.

In another implementation, if the downlink physical channel is ePDCCH, the one or more consecutive CEs over the downlink physical channel refer to one or more consecutive eCCEs within an ePDCCH set. In this case, the transmitting unit 920 may transmit an index of the ePDCCH set to the UE.

In a further implementation, if the downlink physical channel is a new physical channel other than PDCCH, ePDCCH, the BS 900 may further include a first multiplexing unit 930 or a second multiplexing unit 940. The first multiplexing unit 930 is configured to multiplex the downlink physical channel on one or more consecutive or inconsecutive RGEs within PDCCH. The second multiplexing unit 940 is configured to multiplex the downlink physical channel on one or more consecutive or inconsecutive eRGEs within ePDCCH.

The transmitting unit 920 may further transmit information associated with the resource region to the UE.

In one implementation, the information associated with the resource region may include an index of the first CE among the one or more consecutive CEs, or an offset from the start or end of PDCCH search space.

In another implementation, the information associated with the resource region may include a size of the resource region, which is preconfigured by the BS.

In a further implementation, the information associated with the resource region may be determined by using an RNTI used for scrambling with CRC bits of the one or more dynamic UL/DL configurations. For example, the information associated with the resource region may be expressed by:

$$L\{f(RNTI,k) \bmod \lfloor N_{CE,k}/L \rfloor\}+i, i=0, \ldots, L-1,$$

wherein L is the aggregation level for the one or more dynamic UL/DL configurations, $f(RNTI,k)$ is a function of RNTI and subframe number k, and $N_{CE,k}$ is the number of CEs in subframe k.

It should be noted that two or more different units in this disclosure may be logically or physically combined. For example, the first multiplexing unit 930 and the second multiplexing unit 940 may be combined as one single unit.

Figure 10:
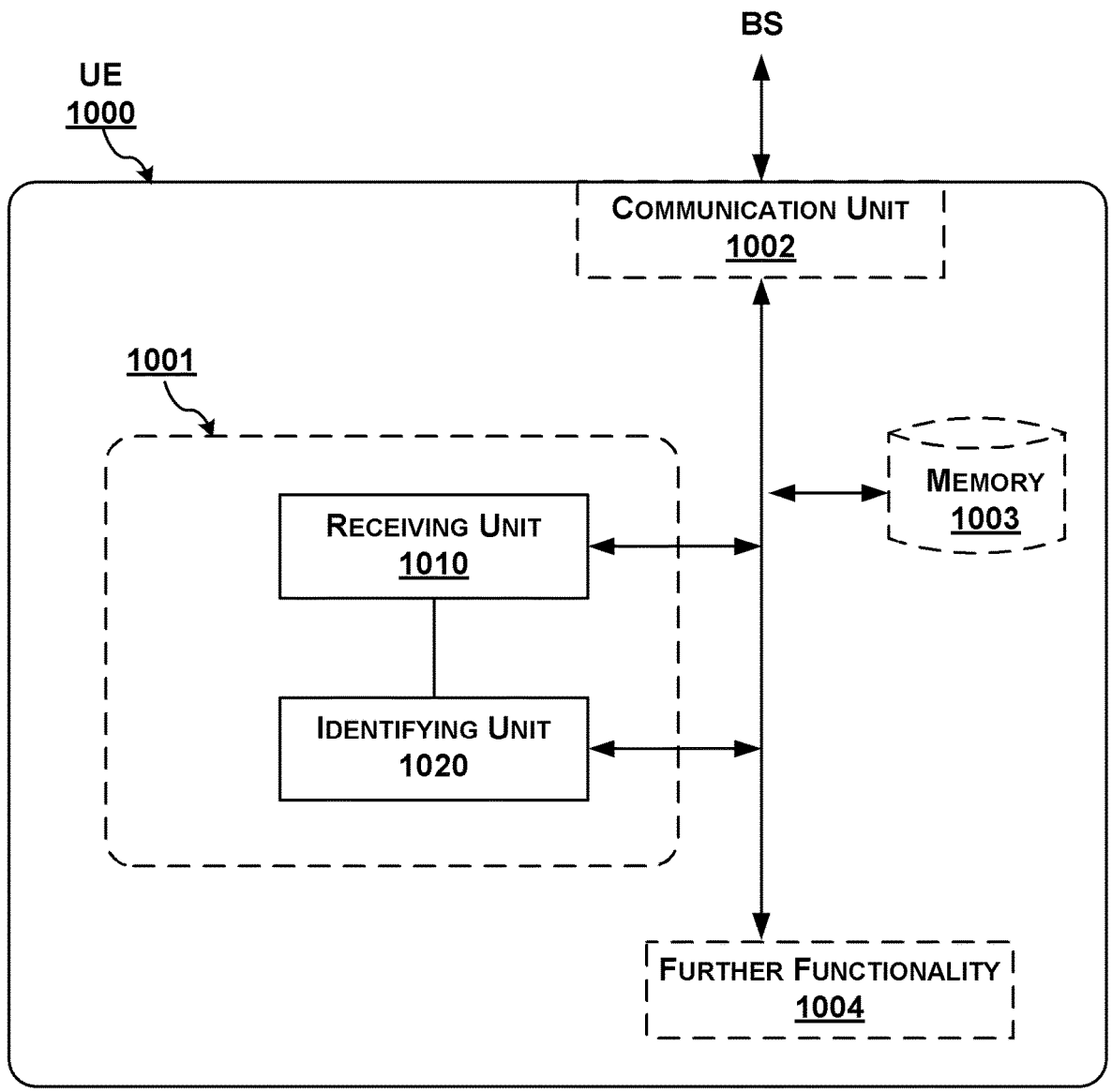
FIG. 10 is a schematic block diagram of UE 1000 according to some embodiments of the present disclosure.

FIG. 10 is a schematic block diagram of UE 1000 according to some embodiments of the present disclosure. The UE 1000 is located in a cell served by a BS.

The part of UE 1000 which is most affected by the adaptation to the herein described method, e.g., the method 400, is illustrated as an arrangement 1001, surrounded by a dashed line. The UE 1000 could be e.g. a mobile terminal, depending on in which type of communication system it is operable, e.g., LTE-type systems. The UE 1000 and arrangement 1001 are further configured to communicate with other entities via a communication unit 1002 which may be regarded as part of the arrangement 1001. The communication unit 1002 comprises means for wireless communication. The arrangement 1001 or UE 1000 may further comprise other functional units 1004, such as functional units providing regular UE functions, and may further comprise one or more storage units 1003.

The arrangement 1001 could be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 4. The arrangement part of the UE 1000 may be implemented and/or described as follows.

Referring to FIG. 10, UE 1000 may include a receiving unit 1010 and an identifying unit 1020.

The receiving unit 1010 may receive, from the BS, one or more dynamic UL/DL configurations of the cell in a resource region consisted of one or more consecutive CEs over a downlink physical channel.

The downlink physical channel may be PDCCH, ePDCCH or a new physical channel other than PDCCH, ePDCCH.

In one implementation, if the downlink physical channel is PDCCH, the one or more consecutive CEs over the downlink physical channel refer to one or more consecutive CCEs. In this example, each of the one or more dynamic UL/DL configurations may correspond to a pica node existing in the cell.

In another implementation, if the downlink physical channel is ePDCCH, the one or more consecutive CEs over the downlink physical channel refer to one or more consecutive eCCEs within an ePDCCH set. In this case, the receiving unit 1010 may further receive an index of the ePDCCH set from the BS.

In a further implementation, if the downlink physical channel is a new physical channel other than PDCCH, ePDCCH, the downlink physical channel may be multiplexed on one or more consecutive or inconsecutive RGEs within PDCCH, or the downlink physical channel may be multiplexed on one or more consecutive or inconsecutive eRGEs within ePDCCH.

The receiving unit 1010 may further receive information associated with the resource region from the BS, and then the identifying unit 1020 may identify the one or more dynamic UL/DL configurations based on the information associated with the resource region.

In one implementation, the information associated with the resource region may include an index of the first CE among the one or more consecutive CEs, or an offset from the start or end of search space of the downlink physical channel.

In another implementation, the information associated with the resource region may include a size of the resource region, which is preconfigured by the BS.

In a further implementation, the information associated with the resource region may be determined by using an RNTI used for scrambling with CRC bits of the one or more dynamic UL/DL configurations. For example, the information associated with the resource region may be expressed by:

$$L\{f(RNTI,k) \bmod \lfloor N_{CE,k}/L \rfloor\}+i, i=0,\ldots,L-1,$$

wherein L is the aggregation level for the one or more dynamic UL/DL configurations, $f(RNTI,k)$ is a function of RNTI and subframe number k, and $N_{CE,k}$ is the number of CEs in subframe k.

According to some embodiments of the present invention, if the resource region is overlapped with a part of the UE's search space, PDCCH candidates in the overlapped part of the UE's search space are excluded from blinding detection of the UE's search space or are still in blinding detection of the UE's search space.

Figure 11:
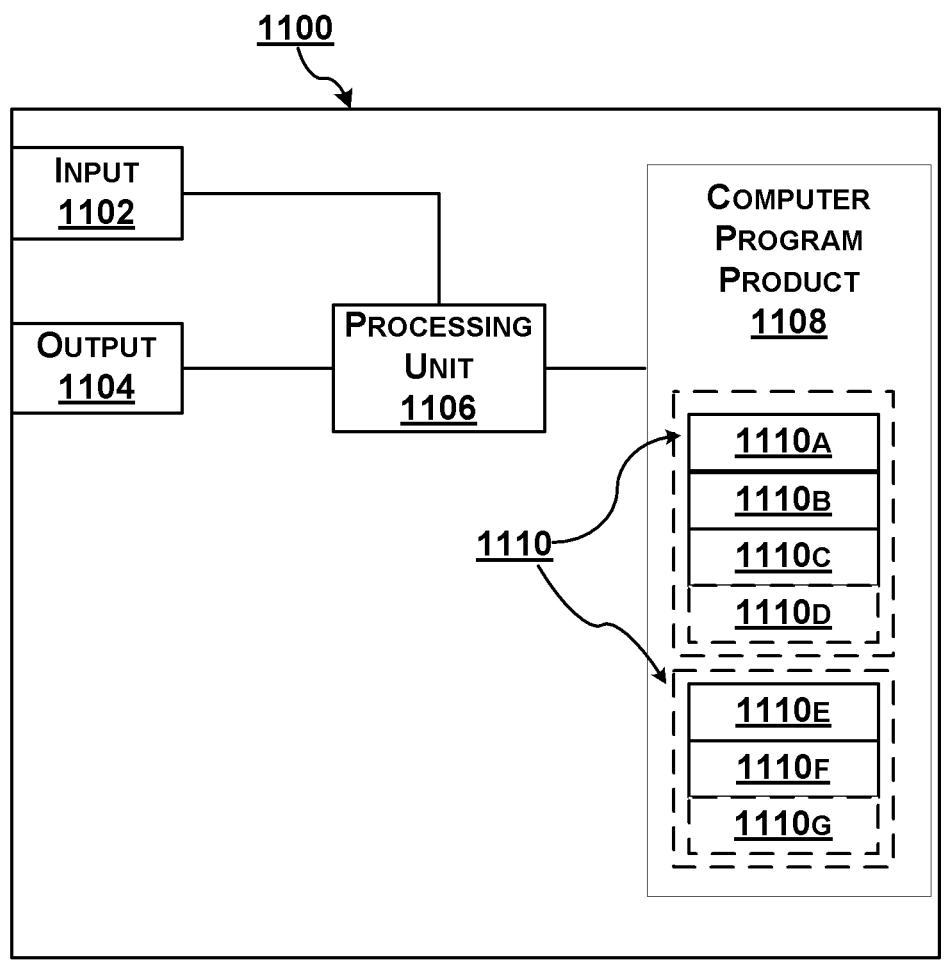
FIG. 11 schematically shows an embodiment of an arrangement 1100 which may be used in the BS 900 or the UE 1000.

FIG. 11 schematically shows an embodiment of an arrangement 1100 which may be used in the BS 900 or the UE 1000. Comprised in the arrangement 1100 are here a processing unit 1106, e.g., with a Digital Signal Processor (DSP). The processing unit 1106 may be a single unit or a plurality of units to perform different actions of procedures described herein. The arrangement 1100 may also comprise an input unit 1102 for receiving signals from other entities, and an output unit 1104 for providing signal(s) to other entities. The input unit and the output unit may be arranged as an integrated entity or as illustrated in the example of FIG. 9 or FIG. 10.

Furthermore, the arrangement 1100 comprises at least one computer program product 1108 in the form of a non-volatile or volatile memory, e.g., an Electrically Erasable Programmable Read-Only Memory (EEPROM), a flash memory and a hard drive. The computer program product 1108 comprises a computer program 1110, which comprises code/computer readable instructions, which when executed by the processing unit 1106 in the arrangement 1100 causes the arrangement 1100 and/or the BS or the UE in which it is comprised to perform the actions, e.g., of the procedure described earlier in conjunction with FIG. 3 or FIG. 4. The computer program 1110 may be configured as a computer program code structured in computer program modules 1110A-1110D or 1110E-1110G. Hence, in an exemplifying embodiment when the arrangement 1100 is used in the BS 900, the code in the computer program of the arrangement 1100 includes an obtaining module 1110A, for obtaining one or more dynamic UL/DL configurations of a cell served by the BS. The code in the computer program 1110 further includes a transmitting module 1110B, for transmitting, to a UE located in the cell, the one or more dynamic UL/DL configurations in a resource region consisted of one or more consecutive CEs over a downlink physical channel and transmitting information associated with the resource region to the UE. The code in the computer program 1110 may further include a multiplexing module 1110C, for multiplexing the downlink physical channel on one or more consecutive or inconsecutive RGEs within PDCCH, or for multiplexing the downlink physical channel on one or more consecutive or inconsecutive eRGEs within ePDCCH. The code in the computer program 1110 may comprise further modules, illustrated as module 1110D, e.g. for controlling and performing other related procedures associated with BS's operations.

In another exemplifying embodiment when the arrangement 1100 is used in the UE 1000, the code in the computer program of the arrangement 1100 includes an receiving module 1110E, for receiving, from the BS, one or more dynamic UL/DL configurations of the cell in a resource region consisted of one or more consecutive CEs over a downlink physical channel, and for receiving information associated with the resource region from the BS. The code in the computer program further includes an identifying module 1110F, for identifying the one or more dynamic UL/DL configurations based on the information associated with the resource region. The code in the computer program 1110 may comprise further modules, illustrated as module 1110G, e.g. for controlling and performing other related procedures associated with UE's operations.

The computer program modules could essentially perform the actions of the flow illustrated in FIG. 3, to emulate the arrangement 901 in the BS 900, or the actions of the flow illustrated in FIG. 4, to emulate the arrangement 1001 in the UE 1000. In other words, when the different computer program modules are executed in the processing unit 1106, they may correspond, e.g., to the units 910-940 of FIG. 9 or to the units 1010-1020 of FIG. 10.

Although the code means in the embodiments disclosed above in conjunction with FIG. 11 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the BS.

Although the present technology has been described above with reference to specific embodiments, it is not intended to be limited to the specific form set forth herein. For example, the embodiments presented herein are not limited to signaling of the dynamic UL/DL configurations; rather they are equally applicable to other appropriate explicit signaling. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

What is claimed is:

1. A method used in a first Base Station (BS), the method comprising:

obtaining a first dynamic UpLink (UL)/DownLink (DL) configuration of a second cell served by a second BS, wherein the second cell is within a first cell served by the first BS;

obtaining a second dynamic UL/DL configuration of a third cell served by a third BS, wherein the third cell served by the third BS is within the first cell served by the first BS;

allocating a first resource region comprising one or more consecutive control elements (CEs) over a downlink physical channel for transmitting the first dynamic UL/DL configuration;

allocating a second resource region comprising one or more consecutive CEs over the downlink physical channel for transmitting the second dynamic UL/DL configuration, wherein the first resource region does not overlap with the second resource region;

transmitting, to a User Equipment (UE) located in the first cell, the first dynamic UL/DL configuration in the allocated first resource region and the second dynamic UL/DL configuration in the allocated second resource region over the downlink physical channel, wherein the downlink physical channel is a physical channel other than a Physical Downlink Control CHannel (PDCCH) and an enhanced PDCCH (ePDCCH), and wherein the downlink physical channel is multiplexed on one or more consecutive or inconsecutive enhanced Resource Element Groups (eREGs) within the ePDCCH; and transmitting, to the UE, information associated with the allocated first resource region and the allocated second resource region, wherein the information associated with the allocated first resource region is determined by using an RNTI that is used for scrambling with CRC bits of the first dynamic UL/DL configuration, and wherein the information associated with one of the allocated first and the allocated second resource region includes an offset from the start or end of search space of the ePDCCH.

2. The method of claim 1, wherein the information associated with the one of the allocated first and the allocated second resource region further includes one or more of: an index of a first CE among the one or more consecutive CEs of respective resource region and a size of respective resource region, which is preconfigured by respective BS.

3. The method of claim 1, wherein the information associated with the allocated first resource region is expressed by:

$$L\{f(RNTI,k) \bmod \lfloor N_{CE,k}/L \rfloor\}+i,\ i=0,L,L-1$$

wherein L is an aggregation level for the first dynamic UL/DL configuration, $f(RNTI, k)$ is a function of the RNTI and subframe number k, and $N_{CE,k}$ is number of CEs of the allocated first resource region in subframe k.

4. The method of claim 1, wherein the first BS is a macro BS, and wherein the second BS and the third BS are pico BSs.

5. The method of claim 1, wherein the information associated with the allocated second resource region is determined by using an RNTI used for scrambling with CRC bits of the second dynamic UL/DL configuration.

6. The method of claim 1, wherein the information associated with the allocated second resource region is expressed by:

$$L\{f(RNTI,k) \bmod \lfloor N_{CE,k}/L \rfloor\}+i,\ i=0,L,L-1$$

wherein L is an aggregation level for the second dynamic UL/DL configuration, $f(RNTI,k)$ is a function of an RNTI used for scrambling with CRC bits of the second dynamic UL/DL configuration and subframe number k, and $N_{CE,k}$ is number of CEs of the allocated second resource region in subframe k.

7. The method of claim 1, wherein obtaining the first dynamic UL/DL configuration comprises the first BS receiving the first dynamic UL/DL configuration from the second BS, and wherein obtaining the second dynamic UL/DL configuration comprises the first BS receiving the second dynamic UL/DL configuration from the third BS.

8. A method used in a User Equipment (UE) located in a first cell served by a first Base Station (BS), the method comprising:

receiving, from the first BS, a first dynamic UpLink (UL)/DownLink (DL) configuration of a second cell served by a second BS, in a first resource region comprising one or more consecutive Control Elements (CEs) over a downlink physical channel, wherein the second cell is within the first cell;

receiving, from the first BS, a second dynamic UL/DL configuration of a third cell served by a third BS, in a second resource region comprising one or more consecutive CEs over the downlink physical channel, wherein the third cell is within the first cell, wherein the first resource region does not overlap with the second resource region, wherein the downlink physical channel is a physical channel other than a Physical Downlink Control CHannel (PDCCH) and an enhanced PDCCH (ePDCCH), and wherein the downlink physical channel is multiplexed on one or more consecutive or inconsecutive Resource Element Groups (REGs) with the PDCCH;

receiving information, from the first BS, associated with the first resource region and the second resource region, wherein the information associated with the first resource region is determined by using an RNTI that is used for scrambling with CRC bits of the first dynamic UL/DL configuration, and wherein the information associated with one of the first and the second resource region includes an offset from the start or end of search space of the PDCCH; and identifying the first and second dynamic UL/DL configurations based on the information associated with the first and second resource regions, respectively.

9. The method of claim 8, wherein the information associated with the one of the first and the second resource region further includes one or more of: an index of a first CE among the one or more consecutive CEs of respective resource region and a size of respective resource region, which is preconfigured by respective BS.

10. The method of claim 8, wherein if one of the first and the second resource region is overlapped with a part of the search space, PDCCH candidates in the overlapped part of the search space are excluded from blinding detection of the search space or are still in blinding detection of the search space.

11. The method of claim 8, wherein the information associated with the second resource region is determined by using an RNTI used for scrambling with CRC bits of the second dynamic UL/DL configuration.

12. A first Base Station (BS), the first BS comprising:
a memory;
a processor coupled to the memory, wherein the processor is configured to:
obtain a first dynamic UpLink (UL)/DownLink (DL) configuration of a second cell served by a second BS, wherein the second cell is within a first cell served by the first BS;
obtain a second dynamic UL/DL configuration of a third cell served by a third BS, wherein the third cell served by the third BS is within the first cell served by the first BS;

allocate a first resource region comprising one or more consecutive control elements (CEs) over a downlink physical channel for transmitting the first dynamic UL/DL configuration;

allocate a second resource region comprising one or more consecutive CEs over the downlink physical channel for transmitting the second dynamic UL/DL configuration, wherein the first resource region does not overlap with the second resource region;

transmit, to a User Equipment (UE) located in the first cell, the first dynamic UL/DL configuration in the allocated first resource region and the second dynamic UL/DL configuration in the allocated second resource region over the downlink physical channel, wherein the downlink physical channel is a physical channel other than a Physical Downlink Control CHannel (PDCCH) and an enhanced PDCCH (ePDCCH), and wherein the downlink physical channel is multiplexed on one or more consecutive or inconsecutive enhanced Resource Element Groups (eREGs) within the ePDCCH; and transmit, to the UE, information associated with the allocated first resource region and the allocated second resource region, wherein the information associated with the allocated first resource region is determined by using an RNTI that is used for scrambling with CRC bits of the first dynamic UL/DL configuration, and wherein the information associated with one of the allocated first and the allocated second resource region includes an offset from the start or end of search space of the ePDCCH.

13. The first BS of claim 12, wherein the information associated with the one of the allocated first and the allocated second resource region further includes one or more of: an index of a first CE among the one or more consecutive CEs of respective resource region and a size of respective resource region, which is preconfigured by respective BS.

14. A User Equipment (UE) located in a first cell served by a first Base Station (BS), the UE comprising:
a memory;
a processor coupled to the memory, wherein the processor is configured to:
receive, from the first BS, a first dynamic UpLink (UL)/DownLink (DL) configuration of a second cell served by a second BS in a first resource region comprising one or more consecutive Control Elements (CEs) over a downlink physical channel, wherein the second cell is within the first cell;
receive, from the first BS, a second dynamic UL/DL configuration of a third cell served by a third BS, in a second resource region comprising one or more consecutive CEs over the downlink physical channel, wherein the third cell is within the first cell, wherein the first resource region does not overlap with the second resource region, wherein the downlink physical channel is a physical channel other than a Physical Downlink Control CHannel (PDCCH) and an enhanced PDCCH (ePDCCH), and wherein the downlink physical channel is multiplexed on one or more consecutive or inconsecutive Resource Element Groups (REGs) with the PDCCH;
receive information, from the first BS, associated with the first resource region and the second resource region, wherein the information associated with the first resource region is determined by using an RNTI that is used for scrambling with CRC bits of the first dynamic UL/DL configuration, and wherein the information associated with one of the first and the second resource region includes an offset from the start or end of search space of the PDCCH; and identify the first and second dynamic UL/DL configurations based on the information associated with the first and second resource regions, respectively.

15. The UE of claim 14, wherein the information associated with the one of the first and the second resource region further includes one or more of: an index of a first CE among the one or more consecutive CEs of respective resource region and a size of respective resource region, which is preconfigured by respective BS.

16. The UE of claim 14, wherein if one of the first and the second resource region is overlapped with a part of the search space, PDCCH candidates in the overlapped part of the search space are excluded from blinding detection of the search space or are still in blinding detection of the search space.

* * * * *